Patented July 1, 1924.

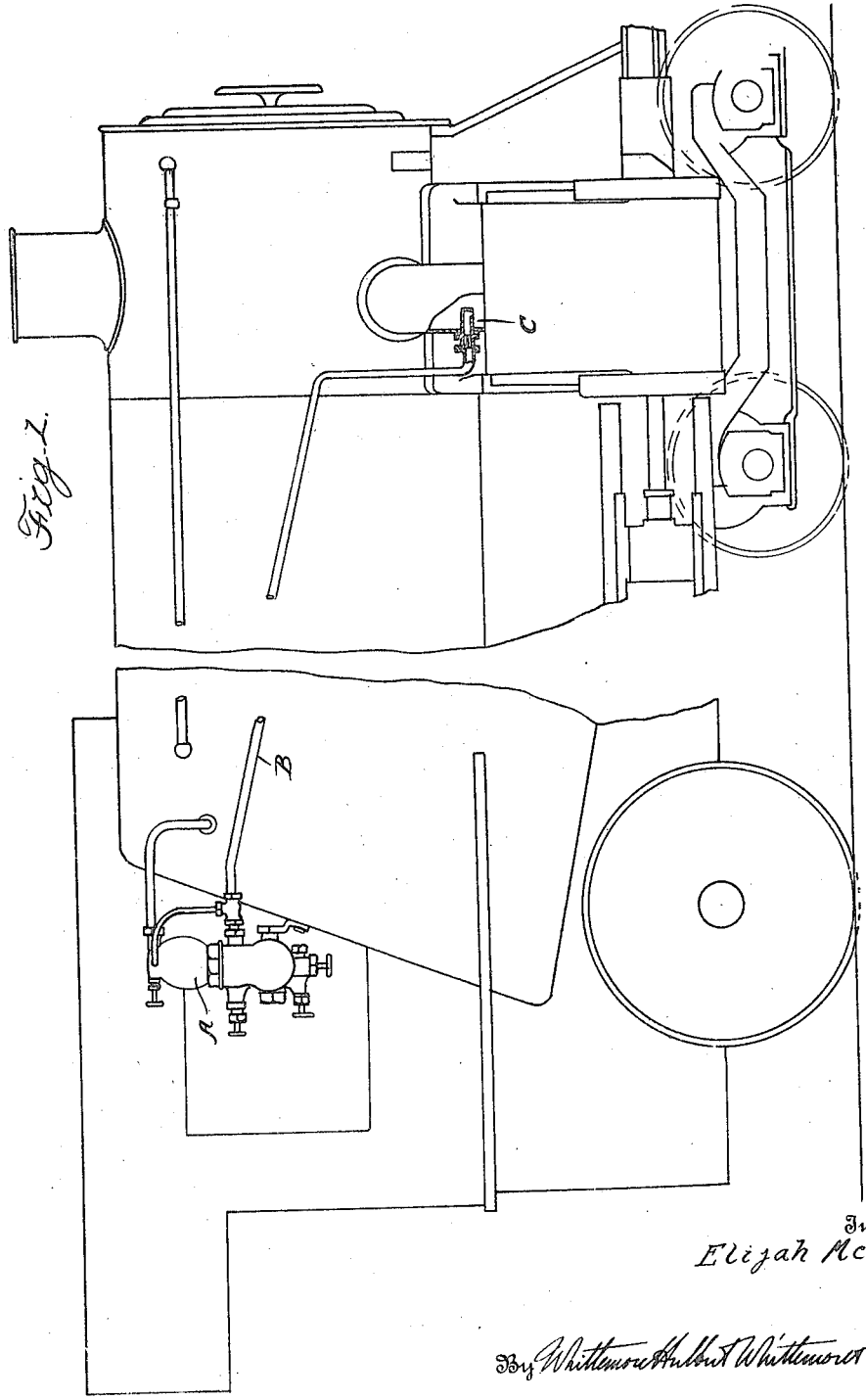

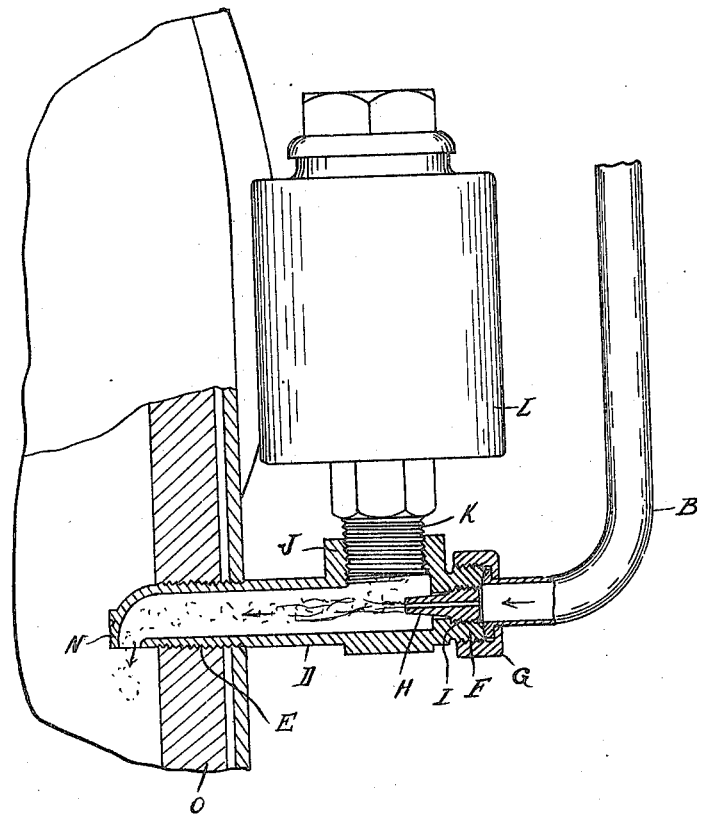
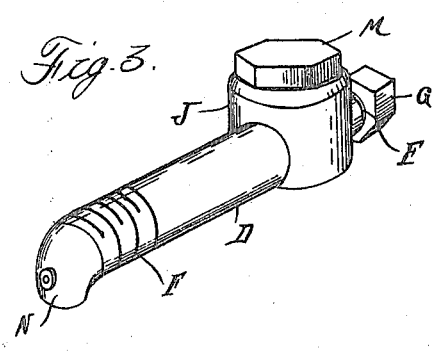

1,499,468

UNITED STATES PATENT OFFICE.

ELIJAH McCOY, OF DETROIT, MICHIGAN, ASSIGNOR TO EDWIN C. NAGEL, OF DETROIT, MICHIGAN.

LUBRICATOR.

Application filed October 2, 1922. Serial No. 591,977.

*To all whom it may concern:*

Be it known that I, ELIJAH McCOY, a citizen of the United States of America, residing at Detroit, in the county of Wayne and State of Michigan, have invented certain new and useful Improvements in Lubricators, of which the following is a specification, reference being had therein to the accompanying drawings.

The invention relates to lubricators more particularly designed for use on locomotives, and it is the object of the invention to provide a simple attachment for the application of solid lubricant in addition to the oil. In the present state of the art it is usual to lubricate the working parts in the cylinders and valve chests of the locomotive by a liquid lubricant conveyed by steam through a conduit extending from the locomotive cab to the valve chest. This lubrication is sometimes supplemented by means for feeding solid lubricant, such as graphite, but the standard equipment comprises merely the conduit for the liquid lubricant and a coupling nipple on the chest to which said conduit is attached. To facilitate the quick installation of the auxiliary device for solid lubricant, I have devised a construction of fitting which may be substituted for the nipple usually attached to the steam chest, said fitting providing both for the attachment of the oil conduit thereto and also for the attachment of any auxiliary lubricator which may be desired. The invention therefore consists in the construction as hereinafter set forth.

In the drawings:

Figure 1 is a diagrammatic view showing a locomotive lubricator with the usual connections to the steam chest;

Figure 2 is an enlarged view showing my substitute fitting with an auxiliary lubricator attached thereto;

Figure 3 is a perspective view of the fitting detached.

A is a lubricator of any suitable construction, designed for the feeding of liquid lubricant, and which is preferably located in the cab of the locomotive. B is the so-called tallow pipe which leads from the lubricator A to the steam chest and C is a fitting such as usually employed for attaching the tallow pipe to the chest. D is my improved fitting which has a threaded portion E engageable with the threaded aperture in the steam chest designed to receive the fitting C. This fitting D is provided at its outer end with the threaded nipple F for engaging the coupling sleeve G of the tallow pipe. H is a nozzle having a restricted passage therethrough, said nozzle having a threaded head I which engages a threaded socket in the nipple F. J is a second nipple, preferably arranged at the top of the fitting D and interiorly threaded to receive the threaded shank K of an auxiliary lubricating cup L. The nipple J is, however, normally provided with a plug fitting M, so that it may be used for attaching the tallow pipe without any auxiliary device. The inner end of the fitting D is preferably provided with a down-turned portion N for discharging the lubricant in a downward direction into the chest.

With the construction as thus far described, the fitting D, together with its plug M, may be used as a replacement for the usual attachment fitting C on the valve chest. This will permit of coupling the tallow pipe without any change either in its length or construction. At the same time, the fitting permits of the attachment of an auxiliary lubricator, such as L, it being merely necessary to remove the plug and engage the nipple of the cup with the nipple J.

In operation, the lubricant is fed in the usual way by pulsating pressure and, when discharged into the chest or steam pipe leading thereto, as indicated at O, it will be out of the path of the highest velocity current, which will insure more uniform distribution.

The auxiliary lubricator L may be of any suitable construction which is adapted to feed solid lubricant such as graphite into the pulsating current. I have therefore omitted any detailed description of this auxiliary lubricator other than to show it attached to the nipple J.

A fitting constructed as described may be used as a replacement of the usual fitting C, even where no auxiliary lubricator is immediately installed. Thus the fitting, when shipped, is always provided with the plug M and may therefore be used solely for coupling the tallow pipe, the attachment of the auxiliary lubricator being deferred. Also, this enables the user to select any type of auxiliary lubricator which may be desired or to change from one type to another.

What I claim as my invention is:

1. In a lubricator, the combination with a tallow pipe, of a fitting for attaching said tallow pipe to a stationary structure, said fitting being provided with a nipple for the alternative engagement of a plug and an auxiliary lubricator.

2. In a lubricator, the combination with a tallow pipe, a nozzle at the end of said pipe and a casing to which said tallow pipe is connected, of a fitting forming the attachment means between said tallow pipe and casing, said fitting having a threaded portion for engagement with said casing, coupling means for attachment to the tallow pipe, and an intermediate nipple between said nozzle and said casing for alternative engagement of a plug and an auxiliary lubricator.

3. In a lubricator, the combination with a tallow pipe and a casing to which said pipe is attached, of a fitting having a threaded portion for engaging said casing, a threaded nipple at its outer end for engagement with the coupling of the tallow pipe, a nozzle in said outer end, and an intermediate nipple between said nozzle and said casing for the alternative engagement of a plug and auxiliary lubricator.

4. In a lubricator, the combination with a tallow pipe and a casing to which said pipe is attached, of a fitting forming the attachment means between said pipe and casing having a threaded portion for engaging the casing, terminating in a downturned portion at its inner end, a threaded nipple at the outer end for engaging the tallow pipe coupling, an intermediate nipple for the alternative engagement of a plug and an auxiliary lubricator, and a restricted nozzle intermediate the tallow pipe and said intermediate nipple.

5. In a lubricator, the combination with a tallow pipe, of a fitting for attaching said tallow pipe to a stationary structure, said fitting being provided with a nozzle at the inlet end thereof, and a nipple between said nozzle and the outlet end of said fitting for the alternative engagement of a plug and an auxiliary lubricator.

In testimony whereof I affix my signature.

ELIJAH McCOY.